(12) United States Patent
Bostick et al.

(10) Patent No.: US 10,664,155 B2
(45) Date of Patent: *May 26, 2020

(54) MANAGING CONTENT DISPLAYED ON A TOUCH SCREEN ENABLED DEVICE USING GESTURES

(71) Applicant: INTERNATIONAL BUSINESS MACHINES CORPORATION, Armonk, NY (US)

(72) Inventors: James E. Bostick, Cedar Park, TX (US); John M. Ganci, Jr., Raleigh, NC (US); Sarbajit K. Rakshit, Kolkata (IN); Craig M. Trim, Ventura, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/026,264

(22) Filed: Jul. 3, 2018

(65) Prior Publication Data
US 2018/0314418 A1 Nov. 1, 2018

Related U.S. Application Data

(63) Continuation of application No. 14/793,166, filed on Jul. 7, 2015, now Pat. No. 10,055,120.

(51) Int. Cl.
*G06F 3/0488* (2013.01)
*G06F 40/103* (2020.01)

(52) U.S. Cl.
CPC ........ *G06F 3/04883* (2013.01); *G06F 40/103* (2020.01); *G06F 2203/04808* (2013.01)

(58) Field of Classification Search
CPC ............... G06F 3/04883; G06F 17/211; G06F 2203/04808; G06F 40/103
See application file for complete search history.

(56) References Cited

U.S. PATENT DOCUMENTS

| 8,451,238 B2 | 5/2013 | Kim et al. |
| 8,610,673 B2 | 12/2013 | Storrusten |

(Continued)

FOREIGN PATENT DOCUMENTS

| WO | 2011026186 | 3/2011 |

OTHER PUBLICATIONS

List of IBM Patents or Patent Applications Treated as Related' 1 page.

*Primary Examiner* — John T Repsher, III
(74) *Attorney, Agent, or Firm* — Brian M. Restauro; Andrew M. Calderon; Roberts Calderon Safran & Cole, P.C.

(57) ABSTRACT

Approaches are provided for managing content displayed on a touch screen enabled device. An approach includes detecting a gesture on a surface of a computing device. The approach further includes collecting data about touch events generated from the gesture on the surface of the computing device. The approach further includes evaluating the collected data to determine whether the gesture is recognized for changing a layout or format of content displayed on the computing device. The approach further includes performing a service call to an application programming interface of a layout tool to have the change in the layout or format of the content executed when the gesture is recognized. The approach further includes displaying the content on the computing device with the change in the layout or format.

13 Claims, 6 Drawing Sheets

(56) References Cited

U.S. PATENT DOCUMENTS

| | | |
|---|---|---|
| 8,650,507 B2 | 2/2014 | Westerman et al. |
| 8,669,955 B2 | 3/2014 | Nishio et al. |
| 2007/0204220 A1* | 8/2007 | Petrov Nickolov ........................ G06F 16/9577 715/234 |
| 2010/0188328 A1* | 7/2010 | Dodge ................ G06F 3/0346 345/156 |
| 2010/0265196 A1 | 10/2010 | Lee et al. |
| 2011/0163971 A1 | 7/2011 | Wagner et al. |
| 2013/0346906 A1 | 12/2013 | Farago |
| 2014/0111458 A1 | 4/2014 | Konami |
| 2014/0173482 A1 | 6/2014 | Hicks et al. |
| 2014/0215308 A1 | 7/2014 | Cantrell et al. |
| 2014/0298254 A1 | 10/2014 | Peng et al. |
| 2015/0261388 A1 | 9/2015 | Wang |
| 2016/0299655 A1* | 10/2016 | Migos ................... G06F 3/0485 |
| 2017/0010781 A1 | 1/2017 | Bostick et al. |

\* cited by examiner

MANAGING CONTENT DISPLAYED ON A TOUCH SCREEN ENABLED DEVICE USING GESTURES

FIELD OF THE INVENTION

The present invention generally relates to content management, and more particularly, to systems and methods for managing content displayed on a touch screen enabled device using gestures.

BACKGROUND

The pervasiveness of touch screen enabled devices is ever increasing, including both mobile device and stationary device types. For example, users can interact with a traditional desktop computer, a tablet computer, a mobile phone, and so on to access a variety of functionality for work and personal uses. Additionally, the variety of functionality that is available to users of touch screen enabled devices also continues to increase.

However, interaction by a user with touch screen enabled devices, and related display content such as text within documents, web pages, notifications, etc., can be hindered by the size and position of the display content submitted to the display of the touch screen enabled devices. For example, the size and position of the display content can provide inadequate viewability and readability of the display content to the user, who typically views or reads the displayed content at any given moment. Consequently, having the appropriate layout or formatting of the display content is important at any given moment for any touch screen enabled device type, usage, or user.

SUMMARY

In a first aspect of the invention, a method is provided for that includes detecting a gesture on a surface of a computing device. The method further includes collecting data about touch events generated from the gesture on the surface of the computing device. The method further includes evaluating the collected data to determine whether the gesture is recognized for changing a layout or format of content displayed on the computing device. The method further includes performing a service call to an application programming interface of a layout tool to have the change in the layout or format of the content executed when the gesture is recognized. The method further includes receiving the change in the layout or format of the content from the layout tool. The method further includes displaying the content on the computing device with the change in the layout or format.

In another aspect of the invention, a computer program product is provided for managing a display of content within an opened electronic document on a computing device. The computer program product includes a computer readable storage medium having program instructions embodied therewith. The computer readable storage medium is not a transitory signal per se, and the program instructions are readable by a computing device to cause the computing device to perform a method that includes performing an initial service call to an application programming interface of a layout tool to obtain functionality for recognizing gestures that are not presently recognized by an application that is being used to display the content. The method further includes detecting a gesture for changing a number of columns of the content displayed on the computing device. The method further includes collecting data about touch events generated from the gesture on a surface of the computing device. The method further includes evaluating the collected data using the obtained functionality for recognizing gestures to determine whether the gesture is recognized for changing the number of columns of the content displayed on the computing device. The method further includes performing a service call to the application programming interface of the layout tool to execute the changing the number of columns of the content when the gesture is recognized. The method further includes receiving the change in the number of columns of the content from the layout tool. The method further includes displaying the content on the computing device with the change in the number of columns.

In a further aspect of the invention, a system is provided for that includes a CPU, a computer readable memory and a computer readable storage medium. The system further includes program instructions to receive user preferences for a layout or format of content displayed on a computing device. The system further includes program instructions to display the content on a display of the computing device based on the user preferences. The system further includes program instructions to perform a first service call to an application programming interface of a layout tool to obtain functionality for recognizing gestures that are not presently recognized by an application that is being used to display the content on the computing device. The obtained functionality includes criteria supported by the layout tool for changing a number of columns of the content. The system further includes program instructions to detect a gesture for changing the number of columns of the content displayed on the computing device. The system further includes program instructions to collect data about touch events generated from the gesture on a surface of the computing device. The system further includes program instructions to compare the collected data to the criteria to determine whether the gesture matches the criteria supported by the layout tool for changing the number of columns of the content. The system further includes program instructions to perform a second service call to the application programming interface of the layout tool to execute the changing the number of columns of the content when the gesture matches the criteria. The system further includes program instructions to receive the change in the number of columns of the content from the layout tool. The system further includes program instructions to display the content on the display of the computing device with the change in the number of columns. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
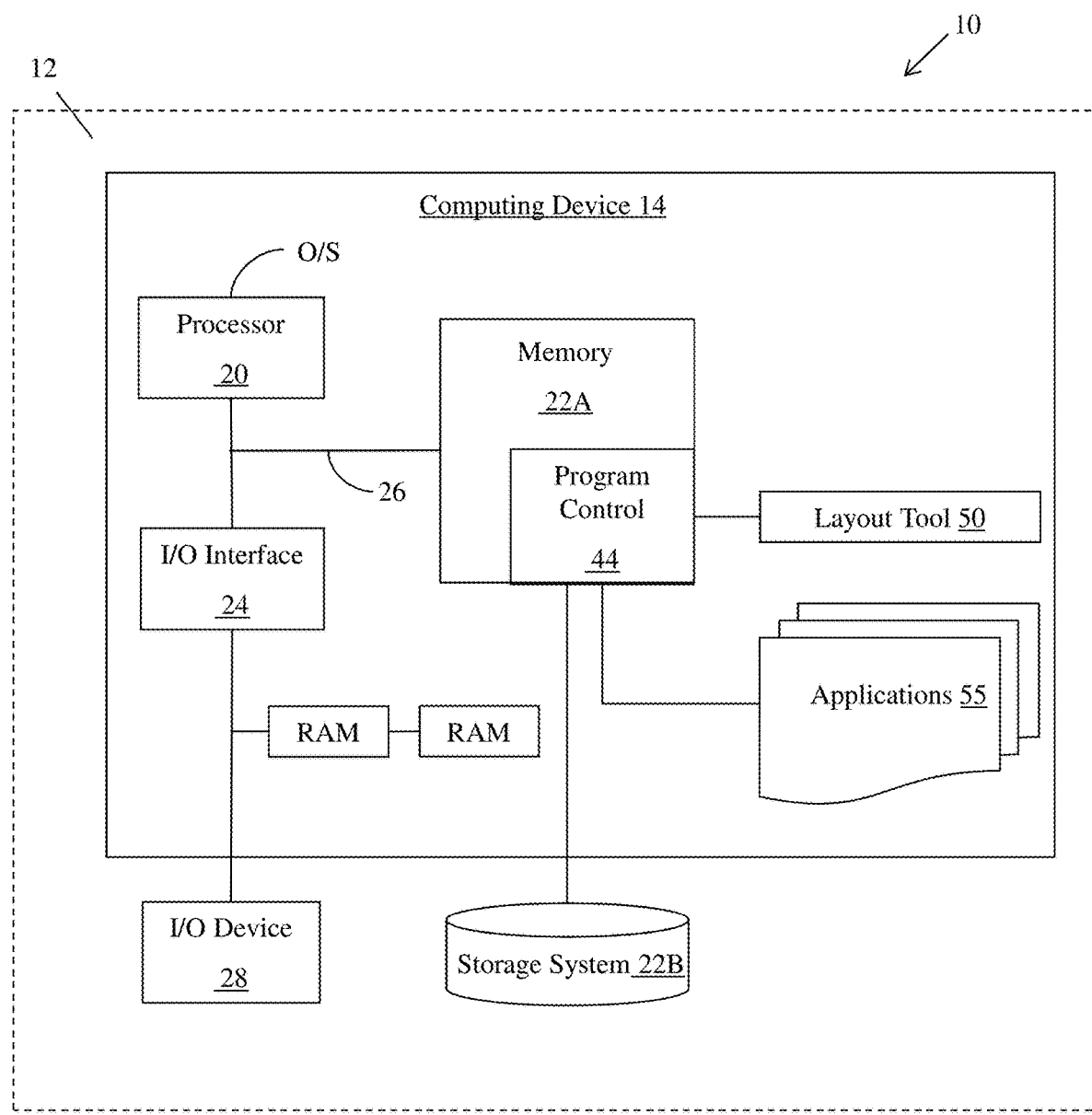
FIG. 1 shows an illustrative environment for implementing the steps in accordance with aspects of the invention.

The present invention generally relates to content management, and more particularly, to systems and methods for managing content displayed on a touch screen enabled device using gestures. More specifically, implementations of the invention provide systems and methods that recognize gestures on a surface of touch screen enabled devices such that a user can change a layout or format of the content (e.g., text) displayed on the touch screen enabled devices. In embodiments, the gesture may include using two or more point of contact pinch and stretch gestures or using one or more point of contact tap and select gestures. The change in layout or format can include rearranging the content from a single column layout into a two or more column layout or merging the content from a two or more column layout into a number of columns that is less than the two or more column layout such that readability or viewability of the display content is enhanced.

More specifically, in accordance with aspects of the present invention, systems and methods are provided for detecting a gesture performed by a user to create one or more columns of content from a selection of the content. In this regard, the position of the content within the one or more columns is created based on points of contact detected from the user's finger(s) or other mechanism of manipulation contacting a surface of the touch screen enabled devices when performing the gesture. In accordance with other aspects of the present invention, systems and methods are provided for detecting a gesture performed by a user to merge two or more columns of content from a selection of the content. In this regard, the two or more columns of content is selected based on points of contact detected from the user's finger(s) or other mechanism of manipulation contacting a surface of the touch screen enabled devices when performing the gesture.

In accordance with further aspects of the present invention, systems and methods are provided for detecting a gesture performed by a user to change a number of columns of content from a selection of the content. In this regard, the number of columns of content is selected based on a number of points of contact detected from the user's finger(s) or other mechanism of manipulation contacting a surface of the touch screen enabled devices when performing the gesture. In accordance with yet further aspects of the present invention, systems and methods are provided for detecting a gesture performed by a user to display a graphical user interface (GUI) representing a layout or format of content. In this regard, a default layout or format can be selected by the user or the layout or format of the content can be changed (e.g., a number of columns used to display the content may be increased or decreased) based on the gesture.

In accordance with additional aspects of the present invention, systems and methods are provided for defining user preferences for the layout and format of content in order to automatically change the display of the content based on display size and characteristics of the touch screen enabled device. In this regard, as thresholds are surpassed, the layout and format of the content can be changed automatically (e.g., a number of columns of content can be increased or decreased). The present invention provides many advantages over conventional touch screen enabled devices, which cannot separate and merge columns of content to enhance readability or viewability of the content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a layout tool 50 and applications 55, which perform processes described herein. The layout tool 50 and applications 55 can be implemented as one or more program code in program control 44 stored in memory 22A as separate or combined modules. Additionally, the layout tool 50 and applications 55 may be implemented as separate dedicated processors or a single or several processors to provide the function of the layout tool 50 and applications 55. While executing the computer program code, the processor 20 can read and/or write data to/from memory 22A, storage system 22B, and/or I/O interface 24. The program code executes the processes of the invention. The bus 26 provides a communications link between each of the components in computing device 14.

In embodiments, the layout tool 50 may be implemented within the O/S of the computing device 14 (e.g., a touch screen enabled device) or as a standalone application or module within the computing device 14, and made available (e.g., made available as a service) to applications 55 of the computing device 14 by way of an application programming interface (API) framework. The API framework defines a set of functionalities of the layout tool 50 that are independent of their respective implementation, allowing both definition and implementation to vary without compromising each other. The API framework is used to allow for the integration of new functionality (e.g., a touch event listening service) into the applications 55 of the computing device 14, or to share data between the applications 55 and the layout tool 50.

By way of example, the layout tool 50 may be configured to provide functionality via the API framework for determining whether a gesture is recognized for changing a layout or formatting of content displayed on the computing device 14. In embodiments, upon recognition of the gesture, the layout tool 50 may be further configured to process a service call from one or more of the applications 55 to obtain functionality supported by the recognized gesture. The processing the service call may include: (i) activating subroutines attached to the recognized gesture based on gathered data regarding the gesture; (ii) performing functionality supported by the recognized gesture on content (e.g., content displayed by one or more of the applications 55) such that the content is modified with the manipulation (e.g., a layout or format change); and (iii) return the results of the service call (e.g., the content modification) to one or more of the applications 55 such that the content modification can be displayed on a display of the computing device 14.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
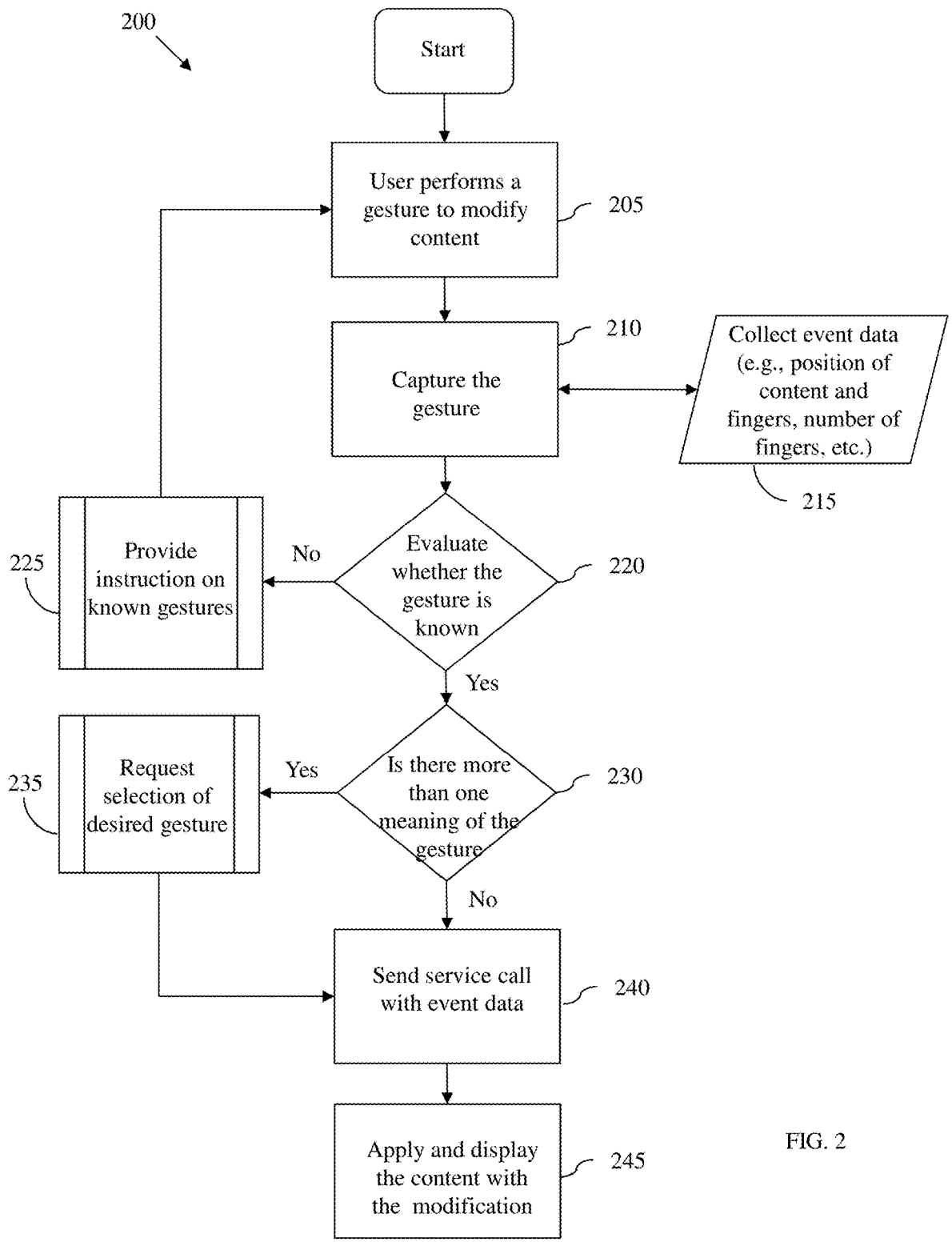
FIG. 2 shows an exemplary flow in accordance with aspects of the invention.
Figure 7:
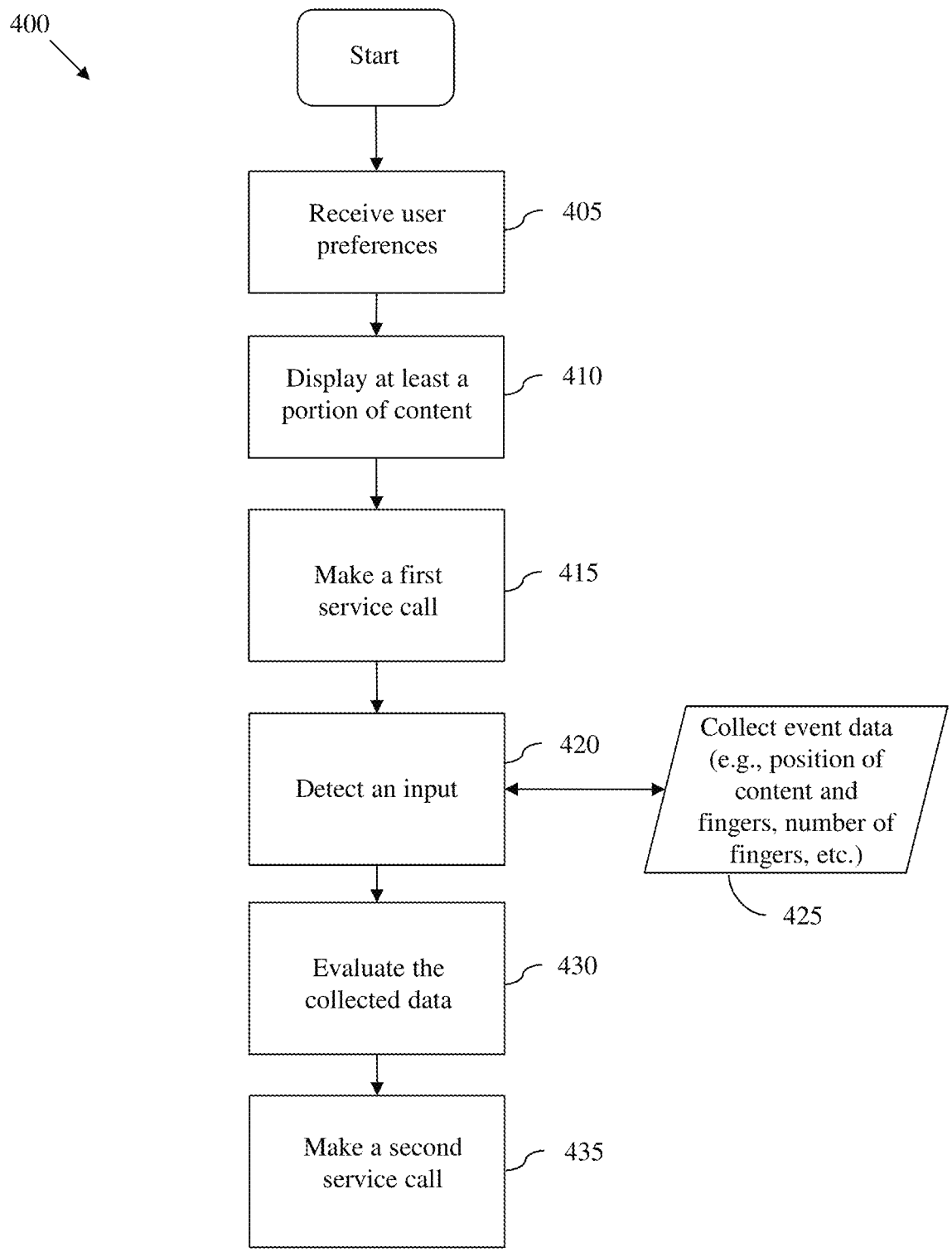
FIG. 7 shows an exemplary flow in accordance with aspects of the invention.

FIGS. 2 and 7 show exemplary flows for performing aspects of the present invention. The steps of FIGS. 2 and 7 may be implemented in the environment of FIG. 1, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 is a flow diagram illustrating a process 200 for managing the display of content on a touch screen enabled device in accordance with aspects of the present invention. At step 205, a user performs a gesture in an attempt to manipulate or modify a layout or format of content that is displayed on a display of a touch screen enabled device. A gesture is the physical act or motion performed on, or by, the input device (finger, fingers, pen/stylus, mouse, and so on). For example, to launch, activate, or invoke a command, a user may use a single finger to tap the touch screen enabled device (equivalent to a left-click with a mouse, a tap with a pen, or Enter on a keyboard). The manipulation is the ongoing reaction or response (e.g., a layout or format change) that the object (e.g., the content) or user interface has to the gesture. For example, both a pinch and stretch gesture may cause content to shrink and expand in some manner (e.g., increase or decrease a number of columns of text). The final outcome of the manipulation, how the manipulation is manifested by the content on the screen and in the user interface, is the interaction. Interactions depend on how a manipulation is interpreted and the command or action that results from the manipulation. For example, a number of columns of content can be increased or decreased through a pinch or stretch gesture, but the results may differ depending on a number of points of contact used in the gesture (e.g., the number of columns of content created can be increased by increasing a number of points of contact in the gesture).

The content may be text provided within one or more electronic documents (e.g., a Microsoft® Word document or an Adobe® portable document, which are registered trademarks of Microsoft Corporation and Adobe System Inc., respectively, in the United States and/or other countries) that are opened using an appropriate document generating and/or editing application (e.g., Microsoft® Office or Adobe® Reader®, which are registered trademarks of Microsoft Corporation and Adobe System Inc., respectively, in the United States and/or other countries) on a touch screen enabled device (e.g., computing device 14 as described with respect to FIG. 1). In embodiments, the one or more electronic documents may be any type of document, such as a report, a letter, a news article, a book, a travel document, a time card, a purchasing or sales agreement, a drawing, an image, a spreadsheet, or other electronic form such as a web page or web document (e.g., a something that has a uniform resource identifier (URI) and can return representations (responses in a format such as HTML or JPEG or RDF) of the identified resource in response to HTTP requests), a file or self contained piece of information available to a computing device, artwork, or a blueprint, etc. It should be understood by those of ordinary skill in the art that the present invention is not limited by the type of electronic document that is opened.

At step 210, the gesture on the touch screen enabled device is detected and captured. For example, the appropriate document generating and/or editing application (e.g., one or more of the applications 55 as described with respect to FIG. 1) may be configured to detect and capture a user initiated gesture on the touch screen enabled device by inheriting touch interaction properties of the layout tool (e.g., layout tool 50 as described with respect to FIG. 1).

More specifically, the application can be configured to leverage the API framework of the layout tool in order to obtain additional functionality (e.g., add on services such as layout or format modification) available from touch interaction properties (e.g., recognized gestures) of the layout tool. In embodiments, the touch screen enabled device includes multi-touch technology, which provides for the ability of a surface (e.g., the touch screen or trackpad) to recognize the presence of one or more points of contact with the surface. This one or more contact point awareness is used to implement the additional functionality to activate certain subroutines attached to predefined gestures defined within the layout tool.

At step 215, the detection and capture of the gesture includes gathering data about the touch events on the touch screen enabled device. The detection of the gesture may start when a user first touches the touch screen with a finger or other mechanism of manipulation (e.g., a stylus), continues as the device tracks the position of the user's finger(s) or other mechanism of manipulation, and ends by capturing a final event of the user's fingers or other mechanism leaving the screen. Throughout this interaction, positional data of the content (e.g., paragraph and layout of an existing display format such as a single column of text), positional data of the user's finger(s) or other mechanism of manipulation delivered to the device (e.g., positional data of points of contact on the surface of the touch screen device and changing positional data of the points of contact indicative of motion by the points of contact), and the number of points of contact made by the finger(s) or other mechanism of manipulation delivered to the device to make the gesture (e.g., two points of contact spreading apart over a single column of text may denote splitting a single column of text into two columns of text) provides the details of every interaction.

At step 220, the gathered data about the touch events on the touch screen enabled device is evaluated to determine whether the gathered data matches any criteria as a recognized or known gesture. For example, the gathered data is evaluated to determine whether the gathered data matches any criteria supported by the layout tool (e.g., layout tool 50 as described with respect to FIG. 1) and/or the application (e.g., one or more of the applications 55 as described with respect to FIG. 1) as a recognized gesture. In embodiments, the application may include functionality for recognizing gestures, and can use the positional data and the number of points of contact made by the user's finger(s) or other mechanism of manipulation delivered to the device to determine if a gesture matches any criteria supported by the layout tool and/or the application.

Figure 3:
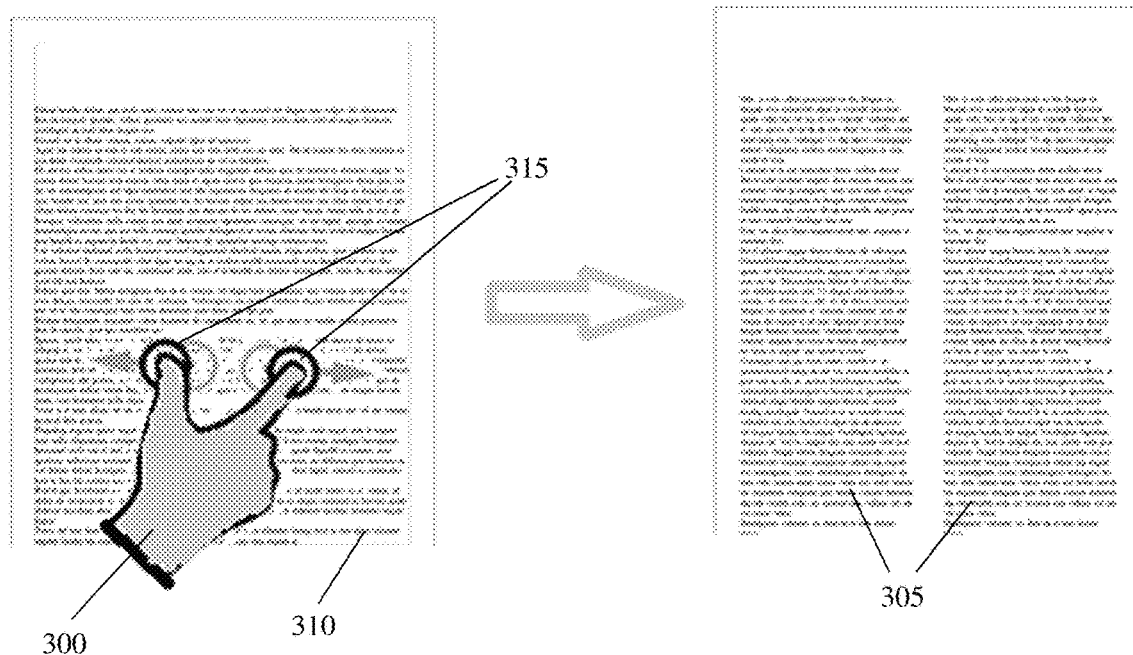
FIGS. 3-6 show visual representations of examples of operation in accordance with aspects of the invention.
Figure 4:
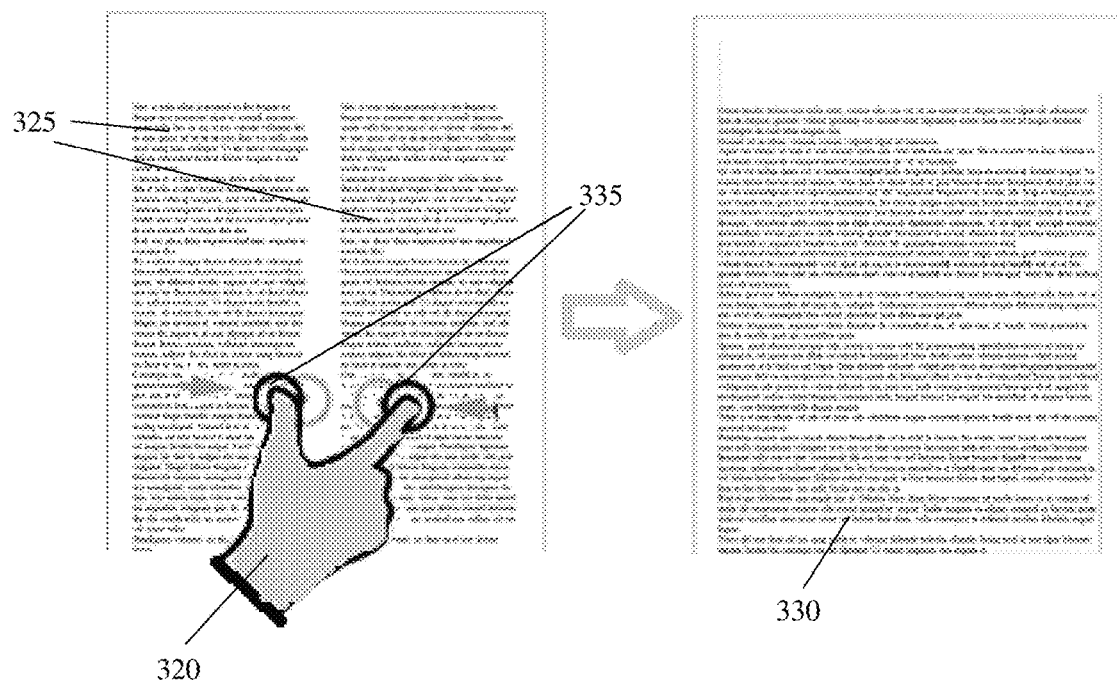

In embodiments, the criteria for gestures that are supported by the layout tool as a manipulation of content may include any number or types of gestures. For example, as shown in FIG. 3, criteria for a stretching gesture 300 can be used to activate a subroutine that creates two or more columns of content 305 from a single column of content 310. In this regard, the two or more columns of content 305 are created based on a position of the one or more points of contact 315 when performing the gesture. Additionally, as shown in FIG. 4, the criteria for a pinching gesture 320 can be used to activate a subroutine that combines two or more columns of content 325 into a lesser number of columns of content 330 (e.g., 2 into 1 or 3 into 2). In this regard, the two or more columns of content 325 are selected based on the points of contact 335 when performing the gesture.

In additional embodiments the criteria for recognized gestures that are supported by the layout tool as a manipulation of content may further include interaction designations such as a number of points of contact made by the user's finger(s) or other mechanism of manipulation on the surface of the touch screen enabled device. For example, two points of contact in a stretching gesture could match criteria and interaction designations indicative of changing the number of columns of content from one column to two columns, and three points of contact in a stretching or pinching gesture could match criteria and interaction designations indicative of changing the number of columns of content from one column to three columns. Alternatively, two points of contact in pinching gesture could match criteria and interaction designations indicative of merging the two columns under the two points of contact, and three points of contact in a pinching gesture could match criteria and interaction designations indicative of merging the three columns under the three points of contact. In embodiments in which the layout of the application and/or computing device support a larger layout (e.g., landscape mode), the layout tool may support four and five points of contact gestures or other mechanisms of manipulation.

Figure 5:
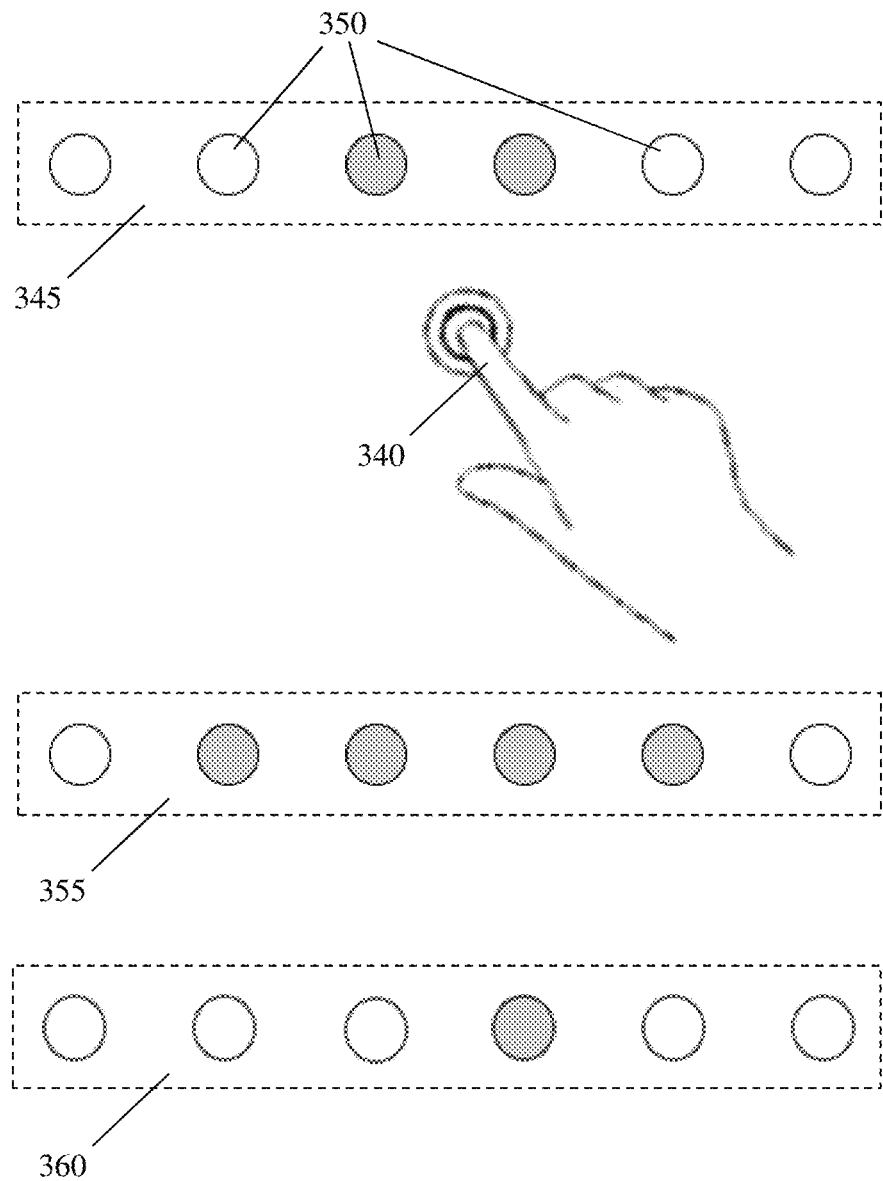

In other embodiments, the criteria for recognized gestures that are supported by the layout tool as a manipulation of content may further include any number or types of gestures made in combination with a GUI. For example, as shown in FIG. 5, a single column of content can be split into two or more columns of content using a tapping gesture 340 to display a GUI 345 comprising a series of images 350 representative of a layout or format of content (e.g., two dots representative of two columns of text). The default series of the images 350 may be indicative of a default layout or format (e.g., two columns of content). From the default series of the images 350, additional gestures (e.g., one or more additional tapping gestures) may be used in combination with the GUI to accept the default layout or format, increase the selected number of images, as shown in GUI 355 (e.g., select more dots to create more columns of content), or decrease the selected number of images, as shown in GUI 360 (e.g., select less dots to create less columns of content).

Similarly a user can select any content for further layout or format changes via any number or types of gestures that match additional criteria supported by the layout tool and/or the application. For example, further layout or format changes may include any resizing of content (e.g., adjusting a relative size of one or more pieces of content within a display area) by way of a pinching or stretching gesture, any rotation of content (e.g., rotating one or more pieces of content relative to a display area) by way of a turning gesture, or any selecting and moving of content (e.g., selecting and dragging content to another position within a display area to change an alignment of the content) by way of a tap or press and hold, and a slide or swipe gesture. However, the above-mentioned additional criteria are merely illustrative of the present invention and it should be understood by those of ordinary skill in the art that the present invention is not limited by the additional criteria supported by the layout tool or the appropriate document generating and/or editing application.

In embodiments, when the gesture is not recognized or unknown either because the application is not leveraging the API framework of the layout tool in order to obtain criteria supported by the layout tool as a recognized gesture, or because the gesture does not match any criteria supported by the layout tool or the application as a recognized gesture, then the process moves to step 225. At step 225, a notification is provided to the user that the gesture is not recognized and instructions are provided on known gestures. For example, the layout tool, O/S of the computing device, or application will notify a user via a pop-up window or other notification service (e.g., a scrolling error notification) that the gesture is not recognized. Additionally, the layout tool, O/S of the computing device, or application will provide the user with a list of known gestures supported by the layout tool and the application. In embodiments, the list of known gestures may also include details on the interaction of content by way of the known gestures (e.g., how the manipulation is manifested by the content on the screen and in the GUI).

In embodiments, when the gesture is recognized or known because the gesture matches the criteria supported by the layout tool and/or the application as a recognized manipulation of content, then the process moves to step 230. At step 230, the gathered data about the touch events on the touch screen enabled device is evaluated to determine whether the gathered data matches more than one criterion as a recognized gesture. For example, the gathered data is evaluated to determine whether the gathered data matches more than one criterion supported by the layout tool (e.g., layout tool 50 as described with respect to FIG. 1) and/or the application as a recognized attempt at a gesture. In embodiments, the application may include functionality for recognizing gestures, and can use the positional data and the number of points of contact made by the user's finger(s) or other mechanism of manipulation delivered to the device to determine if a gesture matches more than one criterion supported by the layout tool and/or the application In embodiments, when the gesture matches more than one criterion supported by the layout tool and/or the application, then the process moves to step 235. At step 235, a notification is provided to the user that the gesture matches more than one criterion supported by the layout tool and/or the application. For example, the layout tool, O/S of the computing device, or application will notify a user via a pop-up window or other notification service (e.g., a scrolling error notification) that the gesture meets more than one criterion supported by the layout tool and/or the application. Additionally, the layout tool, O/S of the computing device, or application will request that the user select one of the operations supported by the more than one criterion that meet the gesture.

At step 240, when either: (i) the gesture does not match more than one criterion supported by the layout tool and/or the application; or (ii) the user selects one of the operations supported by the more than one criterion that matches the gesture (as discussed with respect to step 235), then a service call is sent for the operation supported by the gesture. In embodiments, the service call is sent by the application and received by the layout tool. The service call includes the gathered data about the touch events (as discussed with respect to step 215) and can be sent using any scheme (e.g., any calling convention) configured to send the gathered data as parameters for the subroutines attached to the gesture that are defined within the layout tool.

Figure 6:
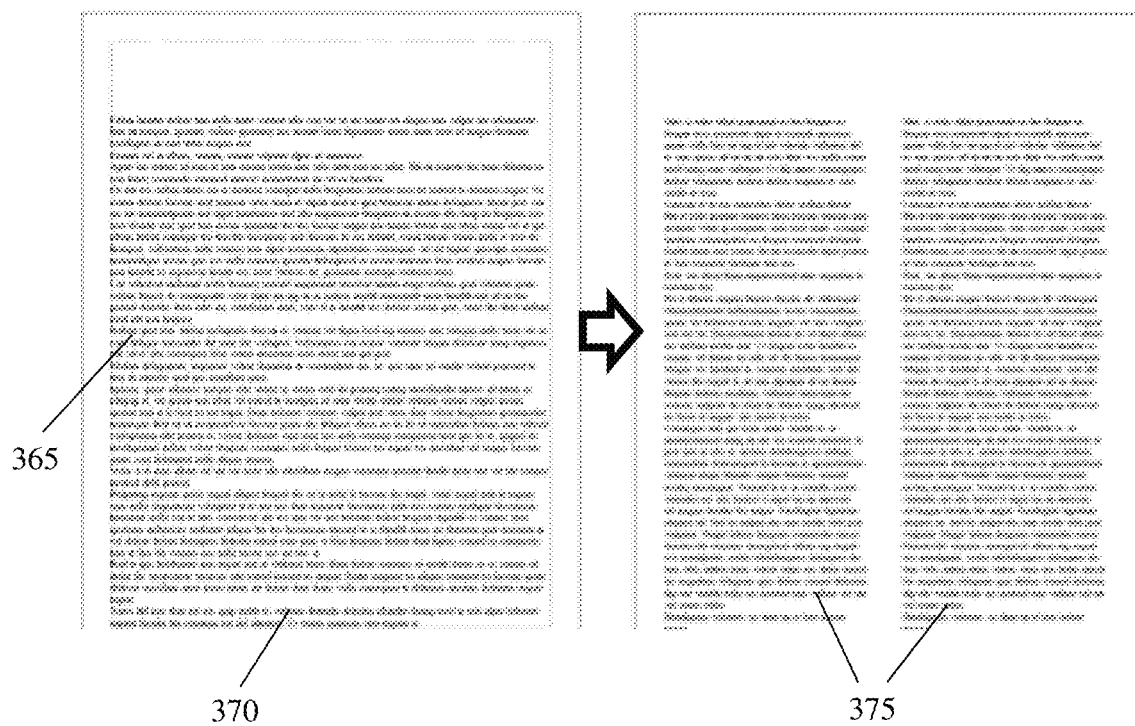

At step 245, the subroutines attached to the gesture are activated based on the gathered data, and the operation supported by the gesture is performed on the content such that the content is modified (e.g., a layout or format change). In embodiments, the layout tool (e.g., layout tool 50 as described with respect to FIG. 1) activates the subroutines to perform the operation and modify the content. The modification of the content is performed as a result of the interaction manifested by way of the detected manipulation of the content. For example, as shown in FIG. 6, in the instance that text content 365 is changed from a single column format 370 to a two column format 375 (i.e., an interaction manifested by way of a detected manipulation of the text content 365), the layout tool (e.g., layout tool 50 as described with respect to FIG. 1) may be configured to adjust the text content 365 (i.e., one or more of the contents within the one or more electronic documents) in such a manner that the single column of text 370 is split into two columns of text 375.

In embodiments, the results (e.g., the manipulation of the content) of the service call are returned from the layout tool to the application such that the application may display the final outcome of the manipulation, or how the manipulation is manifested by the content on the display and in the user interface as the interaction. Advantageously, the present invention is capable of leveraging the API framework of the layout tool in order to obtain additional functionality (e.g., add on services such as layout or format modification) available from touch interaction properties (e.g., recognized gestures) of the layout tool.

FIG. 7 is a flow diagram illustrating a process 400 for interacting with content on a computing device in accordance with embodiments of the present invention. At step 405, user preferences are defined for the layout and format of content displayed on one or more computing devices. For example, a user may use the O/S of one or more computing devices to define the layout and format preferences for content displayed on each of the one or more computing devices. In embodiments, the preferences may be defined based on display size and/or characteristics of the one or more computing devices. For example, a user may generally prefer to have content displayed in a two column layout when viewing the content on a nineteen-inch display but may also prefer to have content displayed in a three column format when viewing the content from a specific text editing application on the nineteen-inch display. Alternatively, a user may generally prefer to have content displayed in a single column layout when viewing the content on a four-inch display such as on a mobile computing device. In this regard, as thresholds (e.g., a size of the display) are surpassed, the layout and format of the content can be changed automatically (e.g., a number of columns of content can be increased or decreased based on a size of the display). In further embodiments, other thresholds are contemplated by the present invention. For example, a threshold can be based on "words per column" such that as the font size is increased, there would be less words in a column and more hyphenated words. A user's preference might be to have fewer columns if the number of words across a column is too few.

At step 410, the computing device displays at least a portion of content on a screen display based on the defined preferences. For example, if a preference is defined that requires textual content be displayed in a two column layout when the display size is greater than six-inches, and a user is using a computing device with a display of ten-inches, then the computing device will display the portion of content on the screen in a two-column layout. The content may be text provided within one or more electronic documents that is opened using an application (e.g., one or more of the applications 55 discussed with respect to FIG. 1). Accordingly, the portion of the content may be displayed using a predefined layout or format based on the defined preferences.

At step 415, a first service call is made to obtain functionality for gestures that are not presently recognized by the application. In embodiments, the first service call is made to the layout tool (e.g., the layout tool 50 discussed with respect to FIG. 1) and includes loading an API of the layout tool and making a request of the API either through unauthorized or authorized access. The request can be implemented via a GET method that retrieves all criteria supported by the layout tool as a recognized gesture. In embodiments, the criteria for gestures that are supported by the layout tool as a manipulation of content may include any number or types of gestures.

At step 420, an input (e.g., two points of content made with a surface of the touch screen enabled device) may be detected on a surface of the computing device. In embodiments, the detection of the input may be based on resistive technology, surface acoustic wave technology, capacitive technology, infrared technology, optical technology, etc as should be known to those of ordinary skill in the art. At step 425, in response to detecting the input, the application may begin to gather data regarding the input. The gathering of the data starts when a user first touches the touch screen in step 420, continues as the device tracks the position of the user's finger(s) or other mechanism of manipulation, and ends by capturing a final event of the user's fingers or other mechanism leaving the screen. Throughout this interaction, positional data of the content (e.g., paragraph and layout of an existing display format such as a single column of text), positional data of the user's finger(s) or other mechanism of manipulation delivered to the device (e.g., positional data of points of contact on the surface of the touch screen device and changing positional data of the points of contact indicative of motion by the points of contact), and the number of points of contact made by the finger(s) or other manipulation delivered to the device to make the gesture (e.g., two points of contact spreading apart over a single column of text may denote splitting a single column of text into two columns of text) provides the details of every interaction.

At step 430, the gathered data about the touch events on the touch screen enabled device is evaluated to determine whether the gathered data matches any criteria as a recognized gesture. For example, the gathered data is evaluated to determine whether the gathered data matches any criteria supported by the layout tool (as retrieved in step 415) or the application as a recognized attempt at the manipulation of the content though a gesture. In embodiments, the evaluation of the gathered data may include determining whether the gesture matches one or more criterion as a recognized gesture, as previously discussed in detail with respect to steps 220-235 of FIG. 2.

At step 435, a second service call is made to obtain functionality supported by the recognized gesture. In embodiments, the second service call is made to the layout tool (e.g., the layout tool 50 discussed with respect to FIG. 1) and includes making a request of the API either through unauthorized or authorized access. The request can be implemented via a MODIFY method that includes the gathered data as the parameters of the method. In embodiments, subroutines attached to the recognized gesture are activated based on the gathered data, and the functionality supported by the recognized gesture is performed on the portion of content such that the portion of the content is modified (e.g., a layout or format change). In embodiments, the results (e.g., the modification of the layout or format of the content) of the second service call are returned from the layout tool to the application (e.g., one or more of the applications 55 discussed with respect to FIG. 1) such that the application may display the final outcome of the manipulation, or how the manipulation is manifested by the portion of content on the display and in the GUI as the interaction. Advantageously, the present invention is capable of leveraging the API framework of the layout tool in order to obtain additional functionality (e.g., add on services such as layout or format modification) available from touch interaction properties (e.g., recognized gestures) of the layout tool.

As should be understood by those of ordinary skill in the art, the above-mentioned examples including modifications of content, aspects of content, and adjustments of content are merely illustrative of the present invention, and thus the present invention is not limited by particular modifications of content, aspects of content, and adjustments of content thereof discussed herein. For example, the present invention is not limited to converting a single column of text to two or more columns of text, and may likewise be applied for adjusting images, audio, animations, etc. without departing from the spirit and scope of the present invention.

In embodiments, the invention provides a method that performs the process of the invention on a subscription, advertising, and/or fee basis. That is, a service provider, such as a Solution Integrator, could offer to provide the data collection and content modification functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for collecting data and modifying content on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:

receive user preferences for a layout or format of content displayed on a computing device;

display the content on a display of the computing device based on the user preferences;

perform a first service call to an application programming interface of a layout tool to obtain functionality for recognizing gestures that are not recognized by an application that is being used to display the content on the computing device, wherein the obtained functionality includes criteria supported by the layout tool for changing a number of columns of the content;

detect a gesture for changing the number of columns of the content on a surface of the computing device;

generate a list of known gestures supported by the layout tool that provides details on how manipulation is manifested by the content and a graphical user interface displayed by the computing device when the gesture does not match the criteria;

perform a second service call to the application programming interface of the layout tool to execute the changing the number of columns of the content when the gesture matches the criteria;

receive a change in the number of columns of the content from the layout tool;

display the content on the computing device with the change in the number of columns of the content; and further change automatically a layout or format of the change in the number of columns of the content in response to thresholds of the computing device being surpassed.

2. The method of claim 1, wherein the computing device is a touch screen enabled device.

3. The method of claim 2, wherein the programming instructions are further operable to:

provide a notification to a user that the gesture is unknown when the gesture is not recognized; and provide instructions to the user on known gestures when the gesture is not recognized.

4. The method of claim 2, wherein the programming instructions are further operable to:

provide a notification to a user that the gesture meets more than one criterion when the gesture meets more than one criterion;

provide a request to the user for selection of one layout or formatting change to be performed from one of the more than one criterion; and receive a selection of the layout or formatting change.

5. The method of claim 1, wherein the content is a single column of text, the gesture is a spreading gesture, and the layout or format change includes splitting the single column of text into two or more columns of text.

6. The method of claim 5, wherein the two or more columns of text is dependent upon the number of points of contact made by finger(s) or other mechanism of manipulation to the surface of the computing device to perform the gesture.

7. The method of claim 1, wherein the content is two or more columns of text, the gesture is a pinching gesture, and the layout or format change includes combining the two or more columns of text into a number of columns of text that is less than the two or more columns of text.

8. The method of claim 7, wherein the number of columns of text is dependent upon the number of points of contact made by finger(s) or other mechanism of manipulation to the surface of the computing device to perform the gesture.

9. The method of claim 1, wherein the content is a single column of text, the gesture is one or more tap gestures, the one or more tap gestures activates a display of a graphical user interface and interacts with the graphical user interface, and the layout or format change includes splitting the single column of text into two or more columns of text.

10. The method of claim 9, wherein the two or more columns of text is dependent upon the interaction of the one or more tap gestures with the graphical user interface for selecting the two or more columns of text.

11. The method of claim 1, wherein the content is two or more columns of text, the gesture is one or more tap gestures, the one or more tap gestures activates a display of a graphical user interface and interacts with the graphical user interface, and the layout or format change includes combining the two or more columns of text into a number of columns of text that is less than the two or more columns of text.

12. The method of claim 11, wherein the number of columns of text is dependent upon the interaction of the one or more tap gestures on the graphical user interface for selecting the number of columns of text.

13. The method of claim 1, wherein a service provider at least one of creates, maintains, deploys and supports the computer infrastructure.

* * * * *